(12) United States Patent
Shafin et al.

(10) Patent No.: US 12,426,124 B2
(45) Date of Patent: Sep. 23, 2025

(54) TUNNELED DIRECT-LINK SETUP CHANNEL SWITCHING WITH NON-SIMULTANEOUS TRANSMIT AND RECEIVE OPERATION

(71) Applicant: Samsung Electronics Co., Ltd., Suwon-si (KR)

(72) Inventors: Rubayet Shafin, Allen, TX (US); Ahmed Atef Ibrahim Ibrahim, Plano, TX (US); Shiyang Leng, Allen, TX (US); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 660 days.

(21) Appl. No.: 17/842,668

(22) Filed: Jun. 16, 2022

(65) Prior Publication Data

US 2023/0337316 A1    Oct. 19, 2023

Related U.S. Application Data

(60) Provisional application No. 63/331,525, filed on Apr. 15, 2022, provisional application No. 63/333,426, (Continued)

(51) Int. Cl.
*H04W 76/23* (2018.01)
*H04W 72/0453* (2023.01)
*H04W 72/20* (2023.01)

(52) U.S. Cl.
CPC ....... *H04W 76/23* (2018.02); *H04W 72/0453* (2013.01); *H04W 72/20* (2023.01)

(58) Field of Classification Search
CPC . H04W 76/23; H04W 72/0453; H04W 72/20; H04W 84/12; H04W 92/18; H04W 76/15
See application file for complete search history.

(56) References Cited

U.S. PATENT DOCUMENTS

2013/0329693 A1* 12/2013 Lee ................. H04W 16/14
370/329
2015/0245317 A1    8/2015 Aoki
(Continued)

FOREIGN PATENT DOCUMENTS

CN        101472299 A    7/2009
WO        2020146401 A1   7/2020
(Continued)

OTHER PUBLICATIONS

IEEE Standards Association; IEEE Std 802.11—2020; IEEE Standard for Information Technology—Telecommunications and Information Exchange between Systems—Local and Metropolitan Area Networks—Specific Requirements; "Part 11: Wireless LAN Medium Access Control (MAC) and Physical Layer (PHY) Specifications"; Dec. 3, 2020; 4379 pgs.

(Continued)

*Primary Examiner* — Kiet Tang

(57) ABSTRACT

Methods and apparatuses for facilitating avoidance of NSTR constraint violation caused by TDLS channel switching and link enablement in multi-link operation (MLO) in a wireless local area network. The methods include determining to switch a frequency channel used by a first tunneled direct (Continued)

link setup (TDLS) direct link from a first frequency channel to a second frequency channel, wherein the TDLS direct link is formed between a station (STA) of a non-access point (AP) multi-link device (MLD) and a corresponding peer STA, generating a TDLS channel switch notification message that includes an indication that the first TDLS direct link is switching from the first to the second frequency channel, and transmitting, to an AP MLD with which the non-AP MLD is associated, on an MLO link, the TDLS channel switch notification message, wherein MLO links are formed between STAs of the non-AP MLD and APs of the AP MLD.

16 Claims, 12 Drawing Sheets

Related U.S. Application Data filed on Apr. 21, 2022, provisional application No. 63/217,015, filed on Jun. 30, 2021.

(56) References Cited

U.S. PATENT DOCUMENTS

| | | |
|---|---|---|
| 2021/0084711 A1 | 3/2021 | Park et al. |
| 2022/0312513 A1* | 9/2022 | Chitrakar .............. H04W 76/14 |
| 2022/0408506 A1 | 12/2022 | Kim et al. |
| 2022/0418018 A1 | 12/2022 | Jang et al. |
| 2023/0180323 A1* | 6/2023 | Sang ........................ H04W 8/22 |
| | | 370/329 |
| 2024/0040639 A1 | 2/2024 | Chitrakar et al. |

FOREIGN PATENT DOCUMENTS

| | | |
|---|---|---|
| WO | 2021085948 A1 | 5/2021 |
| WO | 2021107685 A1 | 6/2021 |

OTHER PUBLICATIONS

LAN/MAN Standards Committee of the IEEE Computer Society; IEEE P802.11be/D1.0; Draft Standard for Information technology—Telecommunications and information exchange between systems Local and metropolitan area networks—Specific requirements; "Part 11: Wireless LAN Medium Access Control (MAC) and Physical Layer (PHY) Specifications"; Amendment 8: Enhancements for extremely high throughput (EHT); May 2021; 635 pgs.

LAN/MAN Standards Committee of the IEEE Computer Society; IEEE P802.11be/D1.01; Draft Standard for Information technology—Telecommunications and information exchange between systems Local and metropolitan area networks—Specific requirements; "Part 11: Wireless LAN Medium Access Control (MAC) and Physical Layer (PHY) Specifications"; Amendment 8: Enhancements for extremely high throughput (EHT); Jun. 2021; 657 pgs.

International Search Report and Written Opinion issued Sep. 22, 2022 regarding International Application No. PCT/KR2022/009031, 8 pages.

Patil et al., "Resolution for CIDs related to TDLS (CC34)", doc.: IEEE 802.11-21/00240r2, Mar. 2021, 9 pages.

Extended European Search Report issued Apr. 16, 2024 regarding Application No. 22833516.2, 11 pages.

* cited by examiner

FIG. 10A

| Frame Control | Duration | RA | TA | TDLS Channel Switch Information | FCS |
|---|---|---|---|---|---|
| 2 | 2 | 6 | 6 | 3 | 4 |

Octets

FIG. 10B

| B0 | B1 | B2 B3 B4 B7 | B8 B15 | B16 B23 |
|---|---|---|---|---|
| Switch to Base Channel | Ack Requested | Reserved Link ID | TDLS Link Identifier | Target Channel |
| 1 | 1 | 2 4 | 8 | 8 |

Bits

FIG. 11

| Frame Control | RA | TA | FCS |
|---|---|---|---|
| 2 | 6 | 6 | 4 |

Octets

TUNNELED DIRECT-LINK SETUP CHANNEL SWITCHING WITH NON-SIMULTANEOUS TRANSMIT AND RECEIVE OPERATION

CROSS-REFERENCE TO RELATED APPLICATION(S) AND CLAIM OF PRIORITY

This application claims priority under 35 U.S.C. § 119(e) to U.S. Provisional Patent Application No. 63/217,015 filed on Jun. 30, 2021, U.S. Provisional Patent Application No. 63/331,525 filed on Apr. 15, 2022, and U.S. Provisional Patent Application No. 63/333,426 filed Apr. 21, 2022, which are hereby incorporated by reference in their entirety.

TECHNICAL FIELD

This disclosure relates generally to simultaneous operation of peer-to-peer links and non-simultaneous transmit and receive links in wireless communications systems that include multi-link devices. Embodiments of this disclosure relate to methods and apparatuses for facilitating harmonious operation of tunneled direct link setup links and non-simultaneous transmit and receive link pairs in stations of multi-link devices in a wireless local area network communications system.

BACKGROUND

Wireless local area network (WLAN) technology allows devices to access the internet in the 2.4 GHz, 6 GHz or 60 GHz frequency bands. WLANs are based on the Institute of Electrical and Electronic Engineers (IEEE) 802.11 standards. The IEEE 802.11 family of standards aim to increase speed and reliability and to extend the operating range of wireless networks.

Multi-link operation (MLO) is a key feature for next generation extremely high throughput (EHT) WI-FI systems. e.g., IEEE 802.11 be. The WI-FI devices that support MLO are referred to as multi-link devices (MI Ds). With MLO, it is possible for a non-access point (non-AP) MLD to discover, authenticate, associate, and set up multiple links with an AP MLD, Channel access and frame exchange is possible on each link that is set up between the AP MLD and non-AP MLD.

MLO has two variations. The first type is simultaneous transmit/receive (STR) where the STAs affiliated with an MLD can transmit and receive independent of each other. The second variation is non-simultaneous transmit/receive (NSTR) in which the links formed by the STAs affiliated with an MILD do not form an STR link pair. If a link pair constitutes an NSTR link pair, transmission on one link can cause interference to the other link due to signal leakiness which the device's radio transceiver is unable to withstand. Consequently, two STAs forming an NSTR link pair cannot simultaneously transmit and receive frames. Since the STR mode of operation requires two or more radios with sufficient isolation, it is expected that AP MLDs will have STR capabilities while non-AP MI Ds are more likely not to be capable of STR, and thus use NSTR.

Tunneled Direct Link Setup (TDLS) is a key feature for peer-to-peer communication between two non-AP stations (STAs) affiliated with two non-AP MLDs. Harmonious operation between TDLS and NSTR in non-AP MLDs is important n order to realize the potential of multi-link devices in next generation WI-FI systems (e.g., IEEE 802.11 be).

SUMMARY

Embodiments of the present disclosure provide methods and apparatuses for facilitating the avoidance of potential NSTR constraint violation or overlap caused by TDLS channel switching and link enablement in MLO in a wireless local area network.

In one embodiment, a non-AP MLD is provided, comprising a plurality of STAs that each comprise a transceiver, and a processor operably coupled to the transceivers. The transceivers are configured to transmit or receive first signals on an MLO link between the STA and a corresponding AP of an AP MLD with which the non-AP MLD is associated, and to transmit or receive second signals on a TDLS direct link between the STA and a corresponding peer STA operating at the other end of the TDLS direct link. The processor is configured to determine to switch a frequency channel used by a first TDLS direct link from a first frequency channel to a second frequency channel, and to generate a TDLS channel switch notification message that includes an indication that the first TDLS direct link is switching from the first frequency channel to the second frequency channel. One or more of the transceivers corresponding to the STAs affiliated with the non-AP MLD are further configured to transmit, to the AP MLD on one of the MLO links between the AP MLD and the non-AP MLD, the TDLS channel switch notification message.

In another embodiment, an AP MLD is provided, comprising a plurality of APs that each comprise a transceiver, and a processor operably coupled to the transceivers. The transceivers are each configured to transmit or receive first signals on an MLO link between the APs and corresponding first STAs of a non-AP MLD with which the AP MLD is associated, wherein a first TDLS direct link is formed between a first STA of the first non-AP MLD and a corresponding peer STA operating at the other end of the TDLS direct link. One or more of the transceivers are further configured to receive, from the non-AP MLD on one of the MLO links between the AP MLD and the non-AP MLD, a TDLS channel switch notification message that includes an indication that the first TDLS direct link is switching from a first frequency channel to a second frequency channel. The processor is configured to determine, based on the TDLS channel switch notification message, that the first TDLS direct link either is switching or has switched from the first frequency channel to the second frequency channel.

In another embodiment, a method performed by a non-AP MLD is provided, including the steps of determining to switch a frequency channel used by a first tunneled direct link setup (TDLS) direct link from a first frequency channel to a second frequency channel, wherein the TDLS direct link is formed between a station (STA) of a non-access point (AP) multi-link device (MLD) and a corresponding peer STA, generating a TDLS channel switch notification message that includes an indication that the first TDLS direct link is switching from the first frequency channel to the second frequency channel, and transmitting, to an AP MLD with which the non-AP MLD is associated, on a multi-link operation (MLO) link between the AP MLD and the non-AP MLD, the TDLS channel switch notification message, wherein MLO links are formed between STAs of the non-AP MLD and APs of the AP MLD.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another, and does not limit the components in other aspect (e.g., importance or order). It is to be understood that if an element (e.g., a first elements is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example. "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory, A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

The following documents and standards descriptions are hereby incorporated into the present disclosure as if fully set forth herein:

[1] IEEE P802.11be/D1.0—Draft Standard for Information technology—Telecommunications and information exchange between systems Local and metropolitan area networks—Specific requirements—Part. II: Wireless LAN Medium Access Control (MAC) and Physical Layer (PHY) Specifications—Amendment 8: Enhancements for extremely high throughput (EHT).

[2] IEEE 80211-2020—IEEE Standard for Information Technology—Telecommunications and Information Exchange between Systems—Local and Metropolitan Area Networks—Specific Requirements-Part 11: Wireless LAN Medium Access Control (MAC) and Physical Layer (PITY) Specifications.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings; in which like reference numerals represent like parts:

FIG. 10A illustrates an example format of the TDLS Impending Channel Switch Notification frame as a Control frame according to various embodiments of the present disclosure;

FIG. 1013 illustrates an example field format of the TDLS Channel Switch Information field according to various embodiments of the present disclosure;

FIG. 11 illustrates an example format of the TDLS Impending Channel Switch Acknowledgement frame as a Control frame according to various embodiments of the present disclosure.

DETAILED DESCRIPTION

Figure 1:
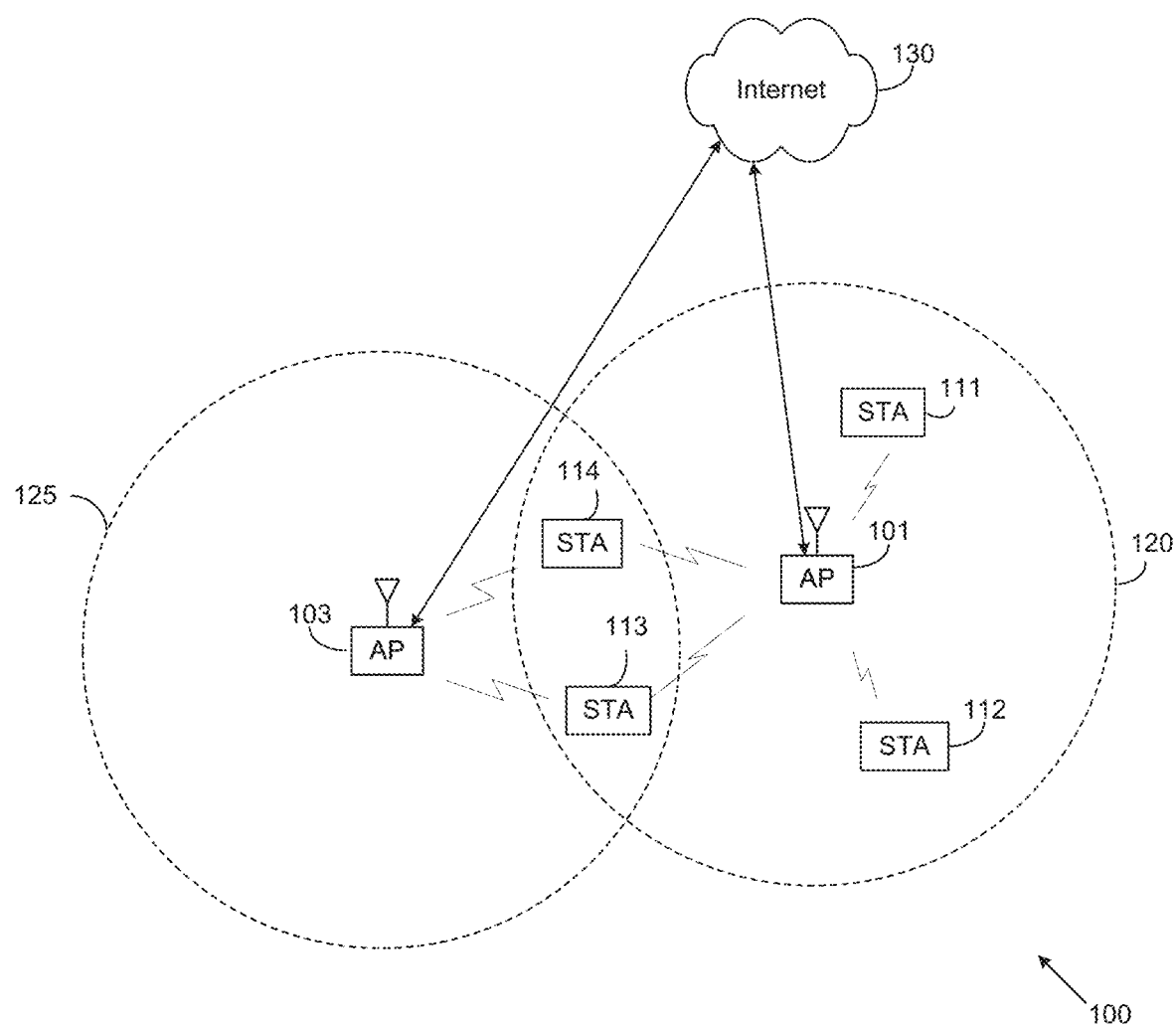
FIG. 1 illustrates an example wireless network according to various embodiments of the present disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that TDLS peer STAs supporting TDLS channel switching may negotiate to switch to another frequency channel, referred to as the off-channel, that is advertised to be supported in the TDLS setup request or response. TDLS channel switching may occur when the primary channel, referred to as the base channel, that, the TDLS peer STAs operate on is congested. The TDLS channel switching operation is conducted between the TDLS peer STAs, and typically the AP is neither involved in the TDLS channel switching procedure nor aware of the off-channel TDLS direct link once the channel switching has succeeded.

Embodiments of the present disclosure further recognize that, in multi-link operation, whenever there is a peer-to-peer link (e.g., a TDLS link) between any pair of STAs affiliated with a pair of non-AP MLDs over one link, and if any of the non-AP MI Ds is not STR capable over any of its links with an AP MLD, then any other NSTR links become essentially ineffective.

Following from the above, embodiments of the present disclosure also recognize that in multi-link operation TDLS peer STAs affiliated with non-AP MLDs can operate over an off-channel TDLS direct link after performing TDLS channel switching. Unaware of the TDLS channel switching, the AP MLD with which the non-AP MLDs are associated can enable an MLO link to any of the STAs affiliated with its associated non-AP MLDs by TID-to-link mapping negotiation if supported, and the newly enabled MLO link can form an NSTR link pair with the off-channel TDLS direct link, or congest the off-channel by overlap. In this scenario, either the enabled link or the off-channel TDLS direct link becomes essentially ineffective with NSTR operation.

Accordingly, embodiments of the present disclosure provide apparatuses and methods that facilitate the avoidance of potential NSTR constraint violation or overlap caused by TDLS channel switching and link enablement in MLO. In particular, embodiments of the present disclosure facilitate the AP MLD discovering the TDLS channel switching in order to avoid enabling an MILO link that forms an NSTR pair with (or that would be congested by) the off-channel MIS direct link, and thereby avoiding the potential clash between the off-channel TILS link operation and any other MLO link operation. Additionally, embodiments of the present disclosure facilitate the non-AP MLD determining to switch the off-channel TDLS direct link back to the base channel, or determining not to perform TDLS channel switching to the off-channel, upon learning that the potentially clashing MLO link is to be enabled.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes APs 101 and 103. The APs 101 and 103 communicate with at least one network 130, such as the Internet, a proprietary Internet Protocol (IP) network, or other data network. The AP 101 provides wireless access to the network 130 for a plurality of STAs 111-114 within a coverage area 120 of the AP 101. The APs 101-103 may communicate with each other and with the STAs 111-114 using Wi-Fi or other WLAN communication techniques.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel; the AP may also be referred to as a STA (e.g., an AP STA). Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to der to remote wireless equipment that wirelessly accesses an AP or contends for a wireless channel in a. WLAN, whether the STA is a mobile device (such as a mobile telephone or smartphone) or is normally considered a stationary device (such as a desktop computer, AP, media player, stationary sensor, television, etc.). This type of STA may also be referred to as a non-AP STA.

In various embodiments of this disclosure, each of the APs 101 and 103 and each of the STAs 111-114 may be an MLD. In such embodiments, APs 101 and 103 may be AP MLDs, and STAs 111-114 may be non-AP MLDs. Each MU) is affiliated with more than one STA. For convenience of explanation, an AP MLD is described herein as affiliated with more than one AP (e.g., more than one AP STA), and a non AP MLD is described herein as affiliated with more than one STA (e.g., more than one non-AP STA).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for facilitating the avoidance of potential NSTR constraint violation or overlap caused by TDLS channel switching and link enablement in MLO in WLANs, Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
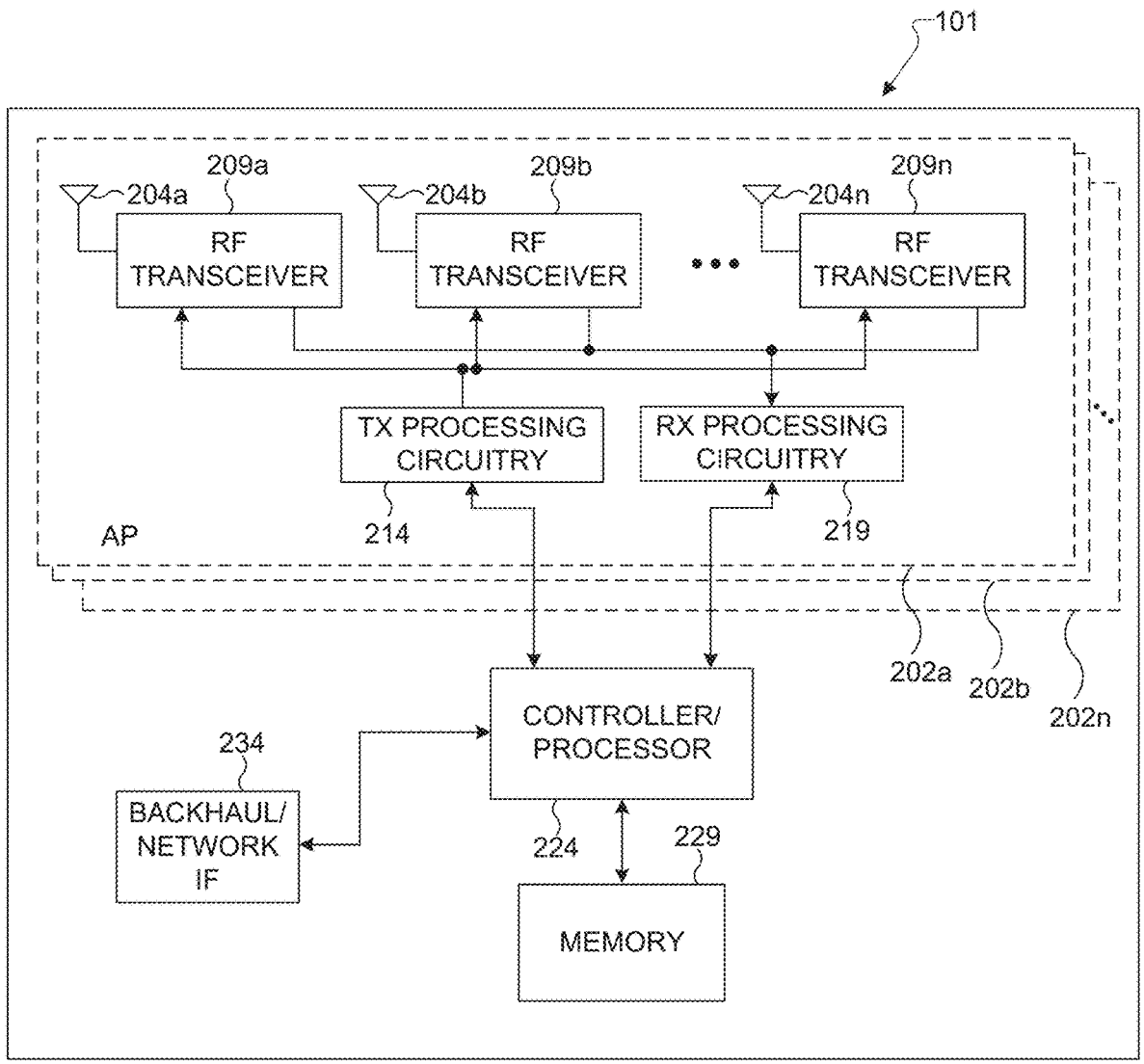
FIG. 2A illustrates an example AP according to various embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. In the embodiments discussed herein below, the AP 101 is an AP MUD. However, APs come in a wide variety of configurations, and FIG. 2A does not limit the scope of this disclosure to any particular implementation of an AP.

The AP MLD 101 is affiliated with multiple APs 202a-202n (which may be referred to, for example, as AP1-APn). Each of the affiliated APs 202a-202n includes multiple antennas 204a-204n, multiple RF transceivers 209a-209n, transmit (TX) processing circuitry 214, and receive (RX) processing circuitry 219. The AP MLD 101 also includes a controller/processor 224, a memory 229, and a backhaul or network interface 234.

The illustrated components of each affiliated AP 202a-202n may represent a physical (PHY) layer and a lower media access control (LMAC) layer in the open systems interconnection (OSI) networking model. In such embodiments, the illustrated components of the AP MLD 101 represent a single upper MAC (UMAC) layer and other higher layers in the OSI model, which are shared by all of the affiliated APs 202a-202n.

For each affiliated AP 202a-202n, the RF transceivers 209a-209n receive, from the antennas 204a-204n, incoming RF signals, such as signals transmitted by STAs in the network 100. In some embodiments, each affiliated AP 202a-202n operates at a different bandwidth. e.g., 2.4 GHz, 5 GHz, or 6 GHz, and accordingly the incoming RF signals received by each affiliated AP may be at a different frequency of RF. In other embodiments, each affiliated AP 202a-202n can operate at various different bandwidths, and the RF transceivers 209a-209n include transceivers capable of operating those different bandwidths. The RF transceivers 209a-209n down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

For each affiliated AP 202a-202n, the TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209a-209n receive the outgoing processed baseband or IF signals from the TX processing circuitry 214 and up-convert the baseband or IF signals to RF signals that are transmitted via the antennas 204a-204n. In embodiments wherein each affiliated AP 202a-202n operates at a different bandwidth, e.g., 2.4 GHz, 5 GHz, or 6 GHz, the outgoing RF signals transmitted by each affiliated AP may be at a different frequency of RF.

The controller/processor 224 can include one or more processors or other processing devices that control the overall operation of the AP MLD 101, For example, the controller/processor 224 could control the reception of forward channel signals and the transmission of reverse channel signals by the RF transceivers 209a-209n, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. The controller/processor 224 could also support OFDMA operations in which outgoing signals are assigned to different subsets of subcarriers for different recipients (e.g., different STAB 111-114). Any of a wide variety of other functions could be supported in the AP MLD 101 by the controller/processor 224 including facilitating the avoidance of potential NSTR constraint violation or overlap caused by TDLS channel switching and link enablement in MLO in WLANs. In some embodiments, the controller/processor 224 includes at least one microprocessor or microcontroller. The controller/processor 224 is also capable of executing programs and other processes resident in the memory 229, such as an OS. The controller/processor 24 can move data into or out of the memory 229 as required by an executing process.

The controller/processor 224 is also coupled to the backhaul or network interface 234. The backhaul or network interface 234 allows the AP MLD 101 to communicate with other devices or systems over a backhaul connection or over a network. The interface 234 could support communications over any suitable wired or wireless connection(s). For example, the interface 234 could allow the AP MLD 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224, Part of the memory 229 could include a RAM, and another part of the memory 229 could include a Flash memory or other ROM.

As described in more detail below, the AP MLD 101 may include circuitry and/or programming for facilitating the avoidance of potential NSTR constraint violation or overlap caused by TDLS channel switching and link enablement in MLO in WLANs. Although FIG. 2A illustrates one example of AP MLD 101, various changes may be made to FIG. 2A. For example, the AP MLD 101 could include any number of each component shown in FIG. 2A. As a particular example, an AP MLD 101 could include a number of interfaces 234, and the controller/processor 224 could support routing functions to route data between different network addresses. As another particular example, while each affiliated AP 202a-202n is shown as including a single instance of TX processing circuitry 214 and a single instance of RX processing circuitry 219, the AP MLD 101 could include multiple instances of each (such as one per RF transceiver) in one or more of the affiliated APs 202a-202n, Alternatively, only one antenna and RF transceiver path may be included in one or more of the affiliated APs 202a-202n, such as in legacy APs. Also, various components in FIG. 2A could be combined, further subdivided, or omitted and additional components could be added according to particular needs.

Figure 2B:
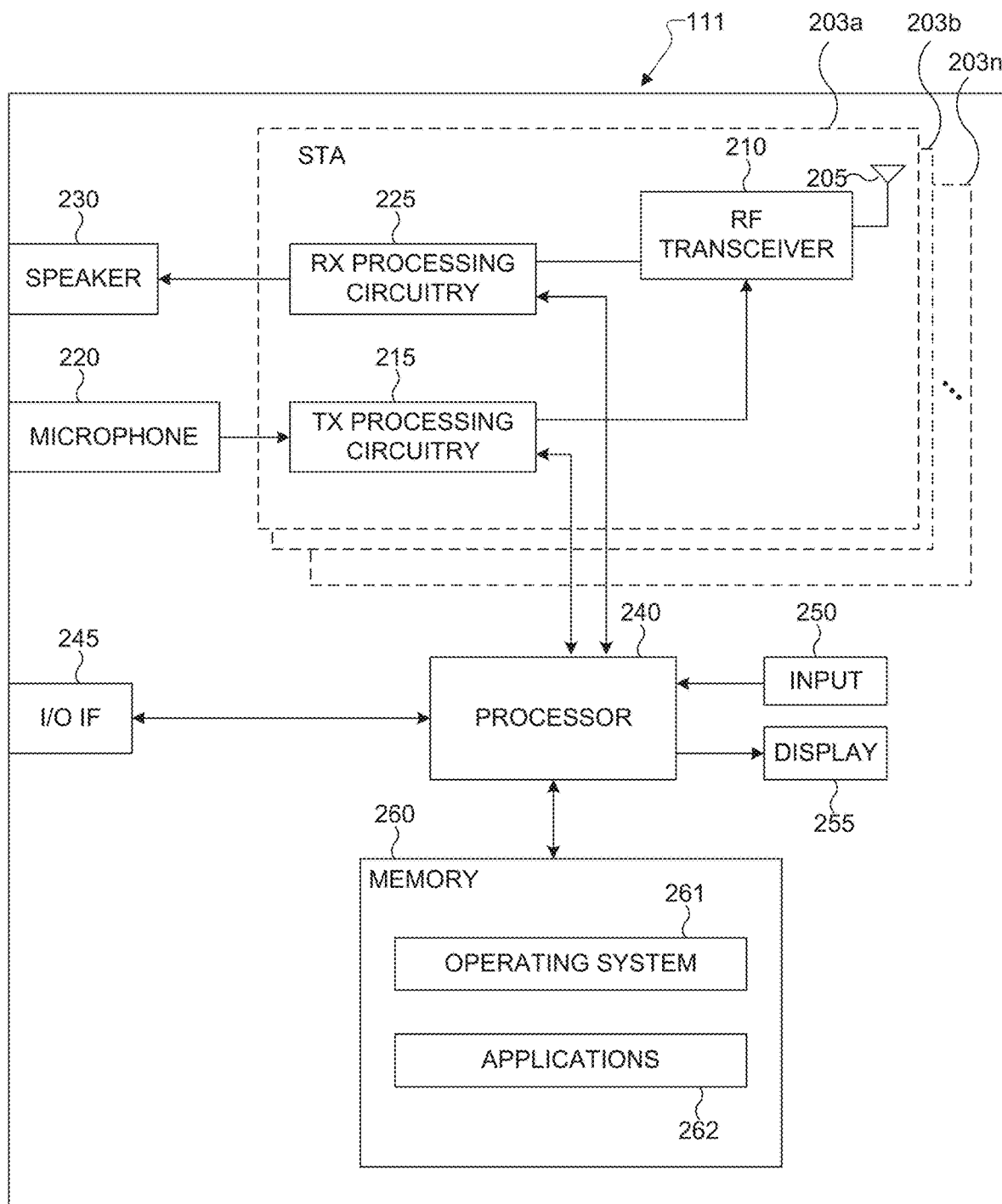
FIG. 2B illustrates an example STA according to various embodiments of this disclosure.

FIG. 2B illustrates an example STA 111 according to various embodiments of this disclosure. The embodiment of the STA 111 illustrated in FIG. 2B is for illustration only, and the STAs 111-115 of FIG. 1 could have the same or similar configuration. In the embodiments discussed herein below, the STA 111 is a non-AP MLD. However, STAs come in a wide variety of configurations, and FIG. 2B does not limit the scope of this disclosure to any particular implementation of a STA.

The non-AP MLD 111 is affiliated with multiple STAs 203a-203n (which may be referred to, for example, as STA1-STAn). Each of the affiliated STAs 203a-203n includes antenna(s) 205, a radio frequency (RI) transceiver 210, TX processing circuitry 215, and receive (RX) processing circuitry 225. The non-AP MLD 111 also includes a microphone 220, a speaker 230, a controller/processor 240, an input/output (I/O) interface (IF) 245, a touchscreen 250, a display 255, and a memory 260. The memory 260 includes an operating system (OS) 261 and one or more applications 262.

The illustrated components of each affiliated STA 203a-203n may represent a PHY layer and an LMAC layer in the OSI networking model. In such embodiments, the illustrated components of the non-AP MLD 111 represent a single UMAC layer and other higher layers in the OSI model, which are shared by all of the affiliated STAs 203a-203n.

For each affiliated STA 203a-203n, the RF transceiver 210 receives, from the antennas) 205, an incoming RF signal transmitted by an AP of the network 100. In some embodiments, each affiliated STA 203a-203n operates at a different bandwidth, e.g, 2.4 GHz, 5 GHz, or 6 GHz, and accordingly the incoming RF signals received by each affiliated STA may be at a different frequency of RF. In other embodiments, each affiliated STA 203a-203n can operate at various different bandwidths, and may include multiple RF transceivers that are capable of operating at those different bandwidths. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

For each affiliated STA 203a-203n, the TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205. In embodiments wherein each affiliated STA 203a-203n operates at a different bandwidth, e.g., 2.4 GHz, 5 GHz, or 6 GHz, the outgoing RF signals transmitted by each affiliated. STA may be at a different frequency of RF.

The controller/processor 240 can include one or more processors and execute the basic OS program 261 stored in the memory 260 in order to control the overall operation of the non-AP MLD 111. In one such operation, the main controller/processor 240 controls the reception of forward channel signals and the transmission of reverse channel signals by the RF transceiver 210, the RX processing circuitry 225, and the TX processing circuitry 215 in accordance with known principles. The main controller/processor 240 can also include processing circuitry configured to provide facilitating the avoidance of potential NSTR constraint violation or overlap caused by TDLS channel switching and link enablement in MLO in WLANs. In some embodiments, the controller/processor 240 includes at least one microprocessor or microcontroller.

The controller/processor 240 is also capable of executing other processes and programs resident in the memory 260, such as operations for facilitating the avoidance of potential NSTR constraint violation or overlap caused by TDLS channel switching and link enablement in MLO in WLANs. The controller/processor 240 can move data into or out of the memory 260 as required by an executing process. In some embodiments, the controller/processor 240 is configured to execute a plurality of applications 262, such as applications for facilitating the avoidance of potential NSTR constraint violation or overlap caused by TDLS channel switching and link enablement in MLO in WLANs. The controller/processor 240 can operate the plurality of applications 262 based on the OS program 261 or in response to a signal received from an AP. The main controller/processor 240 is also coupled to the I/O interface 245, which provides non-AP MLD 111 with the ability to connect to other devices such as laptop computers and handheld computers. The I/O interface 245 is the communication path between these accessories and the main controller 240.

The controller/processor 240 is also coupled to the touchscreen 250 and the display 255. The operator of the non-AP MLD 111 can use the touchscreen 250 to enter data into the non-AP MLD 111. The display 255 may be a liquid crystal display, light emitting diode display, or other display capable of rendering text and/or at least limited graphics, such as from web sites. The memory 260 is coupled to the controller/processor 240. Part of the memory 260 could include a random access memory (RAM), and another part of the memory 260 could include a Flash memory or other read-only memory (ROM).

Although FIG. 2B illustrates one example of non-AP MLD 111, various changes may be made to FIG. 2B. For example, various components in FIG. 2B could be combined, further subdivided, or omitted and additional components could be added according to particular needs. In particular examples, one or more of the affiliated STAs 203a-203n may include any number of antennas) 205 for MIMO communication with an AP 101. In another example, the non-AP MLD 111 may not include voice communication or the controller/processor 240 could be divided into multiple processors, such as one or more central processing units (CPUs) and one or more graphics processing units (GPUs). Also, while FIG. 2B illustrates the non-AP MLD 111 configured as a mobile telephone or smartphone, non-AP MLDs can be configured to operate as other types of mobile or stationary devices.

Figure 3:
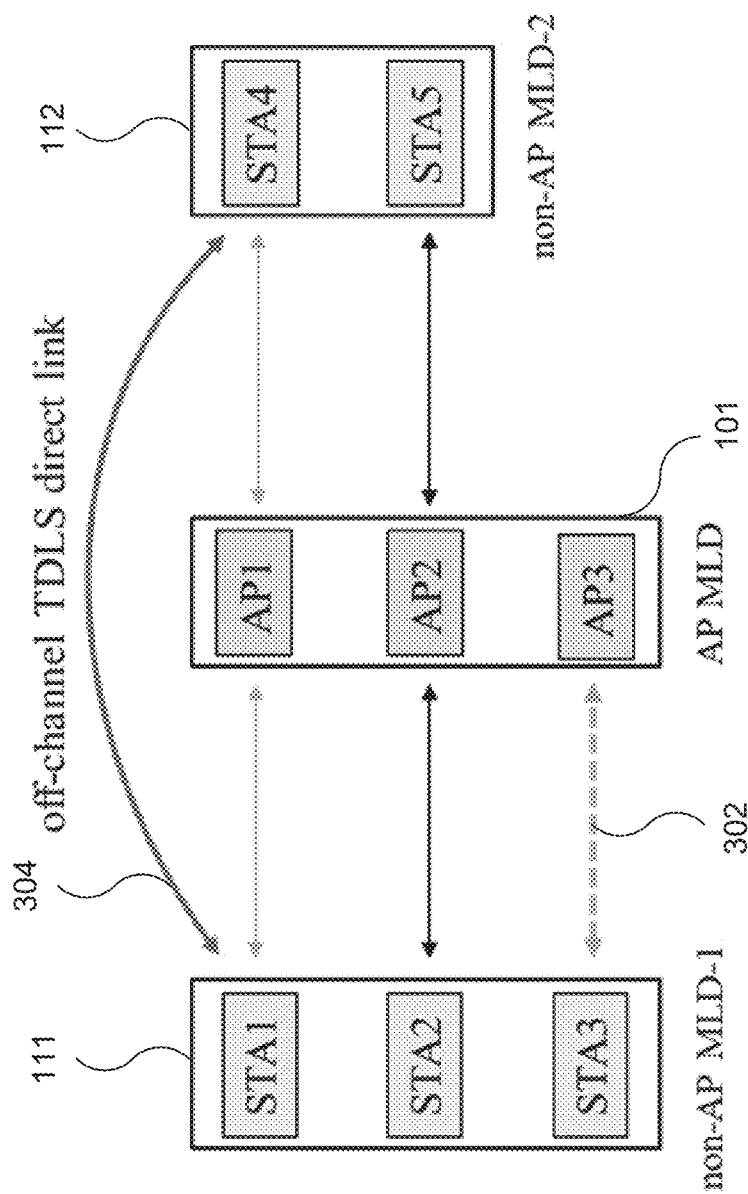
FIG. 3 illustrates an example scenario of potential conflict between an off-channel TDLS direct link and a newly enabled NSTR link according to various embodiments of the present disclosure.

FIG. 3 illustrates an example scenario of potential conflict between an off-channel TDLS direct link and a newly enabled NSTR link according to various embodiments of the present disclosure. For ease of explanation, the AP MLD 101 is illustrated with three affiliated APs, the non-AP MLD 111 is illustrated with three affiliated non-AP STAs, and the non-AP MLD 112 is illustrated with two affiliated non-AP STAs, but it is understood that this process could be applied with suitable MLDs having any number of affiliated APs or STAs.

In the embodiment of FIG. 3, non-AP MLD-1 (e.g., non-AP MLD 111) and non-AP MLD-2 (e.g., non-AP MLD 112) are associated with the AP MLD (e.g., AP MLD 101), where STA1, STA2, and STA3 are affiliated with non-AP MLD-1, STA4 and STA5 are affiliated with non-AP MLD-2, and AP1, AP2, and AP3 are affiliated with the AP MLD.

There are three links set up between the AP MLD and non-AP MLD1, and two links set p between the AP MLD and non-AP MLD2, respectively. The link 302 between STA3 and AP3 is disabled while the other links are enabled.

Furthermore, a TDLS direct link 304 is setup between STA1 and STA4 (which are affiliated with the non-AP MLD1 and the non-AP MI D2, respectively). TDLS channel switching has been performed, and the TDLS direct link 304 is operating on an off-channel, which is on the link 302 between STA3 and AP3 (e.g., the off-channel is the same frequency channel as the disabled MLO link 302 between STA3 and AP3). The AP MLD is unaware of the off-channel TDLS direct link 304 and can intend to enable the link 302 between AP3 and STA3 by initiating a TID-to-link mapping negotiation if supported by the AP MLD and the non-AP MLD, and the link 302 intended to be enabled forms an NSTR link pair with (or overlaps with) the off-channel TDLS direct link 304.

To avoid the potential NSTR operation (or overlap), several solutions are viable. According to some embodiments, when TDLS channel switching is conducted, the TDLS peer STA initiating the TILS channel switch to an off-channel can send a TDLS Channel Switch Notification frame to the associated AP MLD after sending the ACK to the TDLS Channel Switch Response frame, in order to inform the AP MLD of the TDLS channel switching to an off-channel. After channel switching back from the off-channel to the base channel, the TDLS peer STA initiating the TDLS channel switch to the off-channel can send a TDLS Channel Switch Notification frame to the associated AP MLD, to inform the AP MLD the TDLS channel switching to the base channel.

Thus, the AP MLD receiving the notification of TDLS channel switching can avoid enabling a link that possibly forms an NSTR pair with the off-channel TDLS direct link, and can determine to enable the link when the TDLS direct link is operated on the base channel.

An example format for TDLS Channel Switch Notification Action field is shown in Table 1, wherein the information shall be consistent with the information included in the TDLS Channel Switch Request frame triggering the TDLS channel switch to the off-channel. The TDLS Action field value for TDLS Channel Switch Notification can be set to 11, as shown in Table 2.

TABLE 1

| Order | Information |
| --- | --- |
| 1 | Category |
| 2 | TDLS Action |
| 3 | Target Channel |
| 4 | Operating Class |
| 5 | Secondary Channel Offset |
| 6 | Link Identifier |
| 7 | Channel Switch Timing |
| 8 | Wide Bandwidth Channel Switch |
| 9 | Country |
| 10 | Transmit Power Envelope |

TABLE 2

| Action field value | Meaning |
| --- | --- |
| 0 | TDLS Setup Request |
| 1 | TDLS Setup Response |

TABLE 2-continued

| Action field value | Meaning |
| --- | --- |
| 2 | TDLS Setup Confirm |
| 3 | TDLS Teardown |
| 4 | TDLS Peer Traffic Indication |
| 5 | TDLS Channel Switch Request |
| 6 | TDLS Channel Switch Response |
| 7 | TDLS Peer PSM Request |
| 8 | TDLS Peer PSM Response |
| 9 | TDLS Peer Traffic Response |
| 10 | TDLS Discovery Request |
| 11 | TDLS Channel Switch Notification |
| 12-255 | Reserved |

Figure 4:
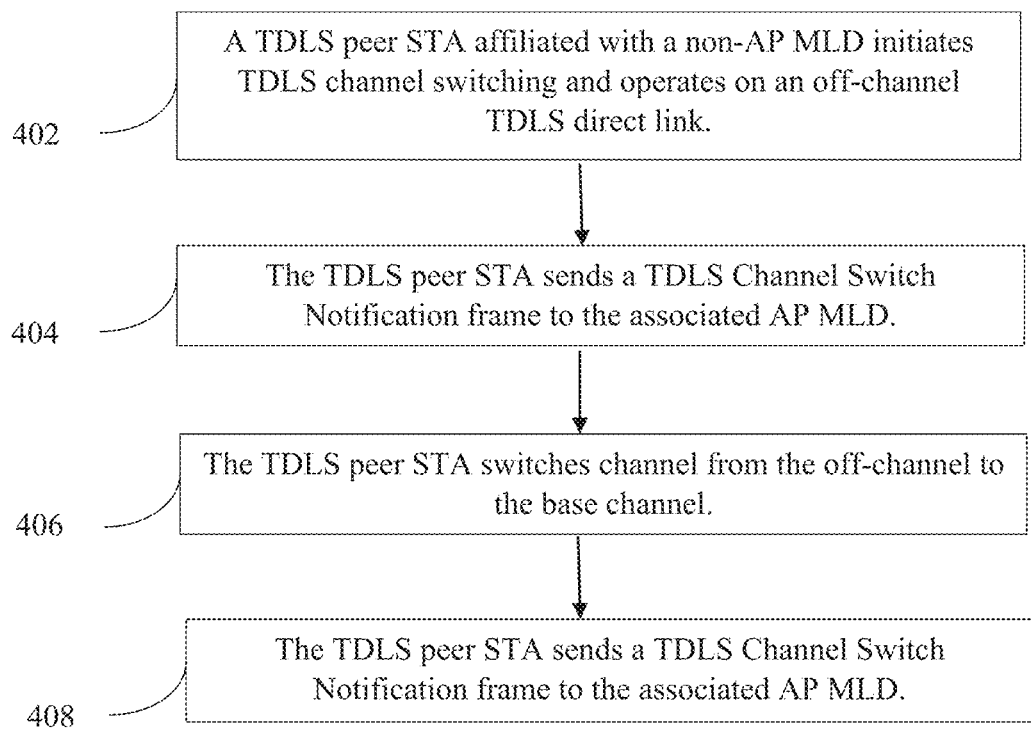
FIG. 4 illustrates an example process for sending a TDLS Channel Switch Notification frame to an AP MLD according to various embodiments of the present disclosure.

FIG. 4 illustrates an example process for sending a TDLS Channel Switch Notification frame to an AP MLD according to various embodiments of the present disclosure. At operation 402, a TDLS peer STA affiliated with a non-AP MLD initiates TDLS channel switching and operates on an off-channel TDLS direct link. At operation 404, the TDLS peer STA sends a TDLS Channel Switch Notification frame to the associated AP MLD. Once at operation 406, the TDLS peer STA switches channel from the off-channel to the base channel, operation 408 is followed that the TDLS peer STA sends a TDLS Channel Switch Notification frame to the associated AP MLD.

Channel Usage is a wireless network management (WNM) action. As an analog to the Channel Usage procedure presented in [1], wherein the Channel Usage information is provided by the AP to the non-AP STA, in various embodiments of the present disclosure, non AP MLDs with which the TDLS peer STAs are affiliated can provide Channel Usage information to the associated AP MLD to indicate the existence of the off-channel TDLS direct link so that the AP MLD can avoid enabling links that would cause NSTR condition violation.

Figure 5:
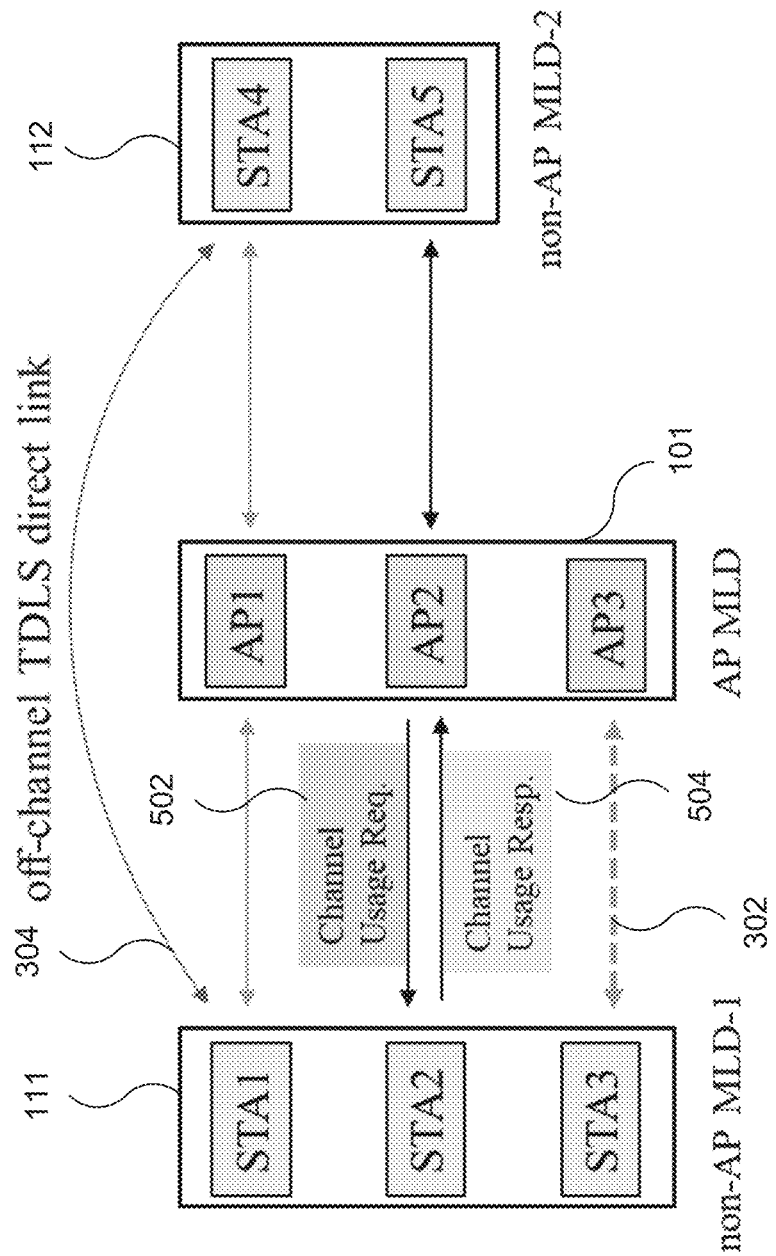
FIG. 5 illustrates an example scenario using Channel Usage information to avoid NSTR condition violation according to embodiments of the present disclosure.

FIG. 5 illustrates an example scenario using Channel Usage information to avoid NSTR condition violation according to embodiments of the present disclosure. The example of FIG. 5 is based on the example of FIG. 3. The AP MI D may send a Channel Usage Request frame (e.g., Channel Usage Request frame 502) to a non-AP MLD that supports the use of Channel Usage at any time after association to request the Channel Usage information for supported operating classes. Upon receiving the Channel Usage Request frame, the non-AP MLD supporting Channel Usage sends a Channel Usage Response frame (e.g., the Channel Usage Response frame 504) including one or more Channel Usage elements. When the Channel Usage element includes one or more Operating Class/Channel Pair fields, the Operating Class/Channel Pair fields indicate the requested AP MLD operating class-'channels for the usage mode indicated in the frame.

According to one embodiment, when TDLS channel switching is conducted, either switching channels from the base channel to an off-channel or from an off-channel to the base channel, TDLS peer STAs supporting Channel Usage can send an unsolicited Channel Usage Response frame including a Channel Usage element to the associated AP MLD to update the usage status of an off-channel. The AP MLD thus can avoid enabling a link that could possibly form an NSTR pair with the off-channel TDLS direct link, and possibly determine to enable the link when the TDLS direct link is operated on the base channel.

Figure 6:
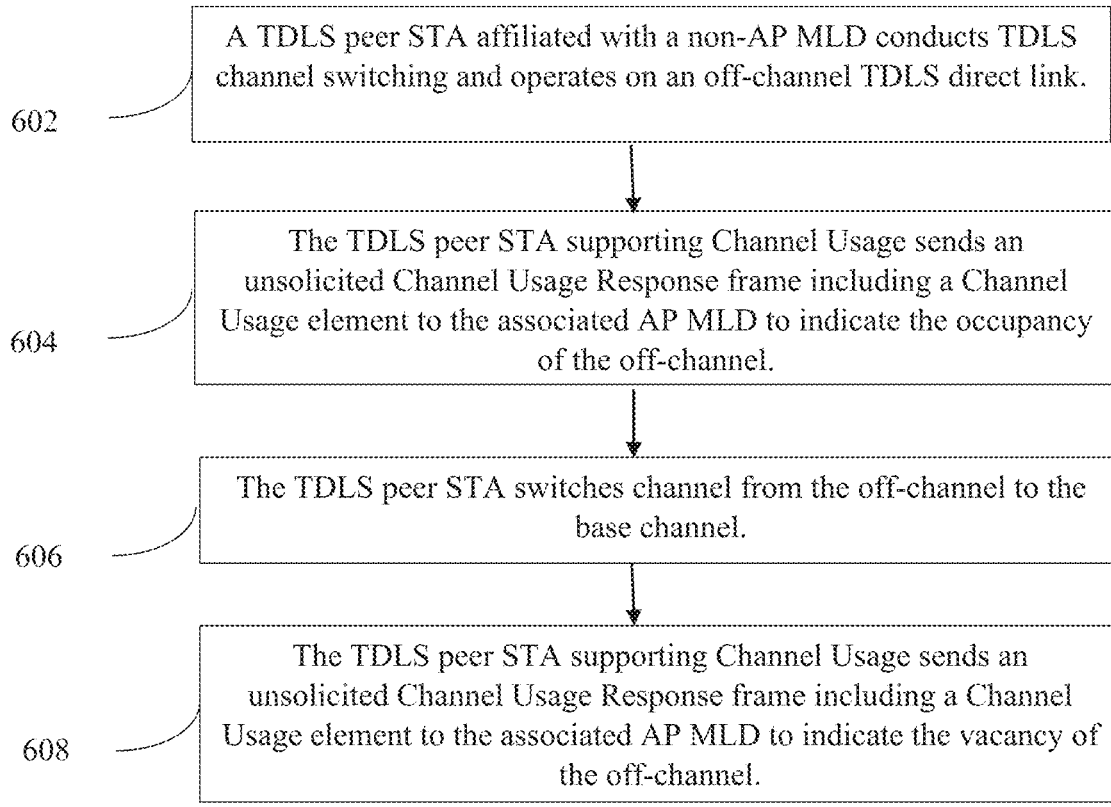
FIG. 6 illustrates an example process for sending an unsolicited Channel Usage Response frame to an AP MLD according to various embodiments of the present disclosure.

FIG. 6 illustrates an example process for sending an unsolicited Channel Usage Response frame to an AP MLD according to various embodiments of the present disclosure. At operation 602, a TDLS peer STA affiliated with a non-AP MU) conducts TDLS channel switching and operates on an off-channel TDLS direct link. At operation 604, the TDLS peer STA supporting Channel Usage sends an unsolicited Channel Usage Response frame including a Channel Usage element to the associated AP MLD to indicate the occupancy of the off-channel. Once at operation 606, the TDLS peer STA switches the TDLS channel from the off-channel to the base channel, and at operation 608 the TDLS peer STA supporting Channel Usage sends an unsolicited Channel Usage Response frame including a Channel Usage element to the associated AP MLD to indicate the vacancy of the off-channel.

According to various other embodiments, when the AP MLD initiates a TID-to-link mapping negotiation to enable a link to a associated non-AP MLD, if the intended link would form an NSTR pair with the off-channel TDLS direct link that a STA affiliated with the non-AP MLD is operating on, the non-AP MLD, which is willing to enable the link while avoiding potential NSTR operation, can decide to switch the TDLS channel back to the base channel by sending an unsolicited TDLS Channel Switch Response frame to the other TDLS peer STA indicating the base channel as the target channel.

Figure 7:
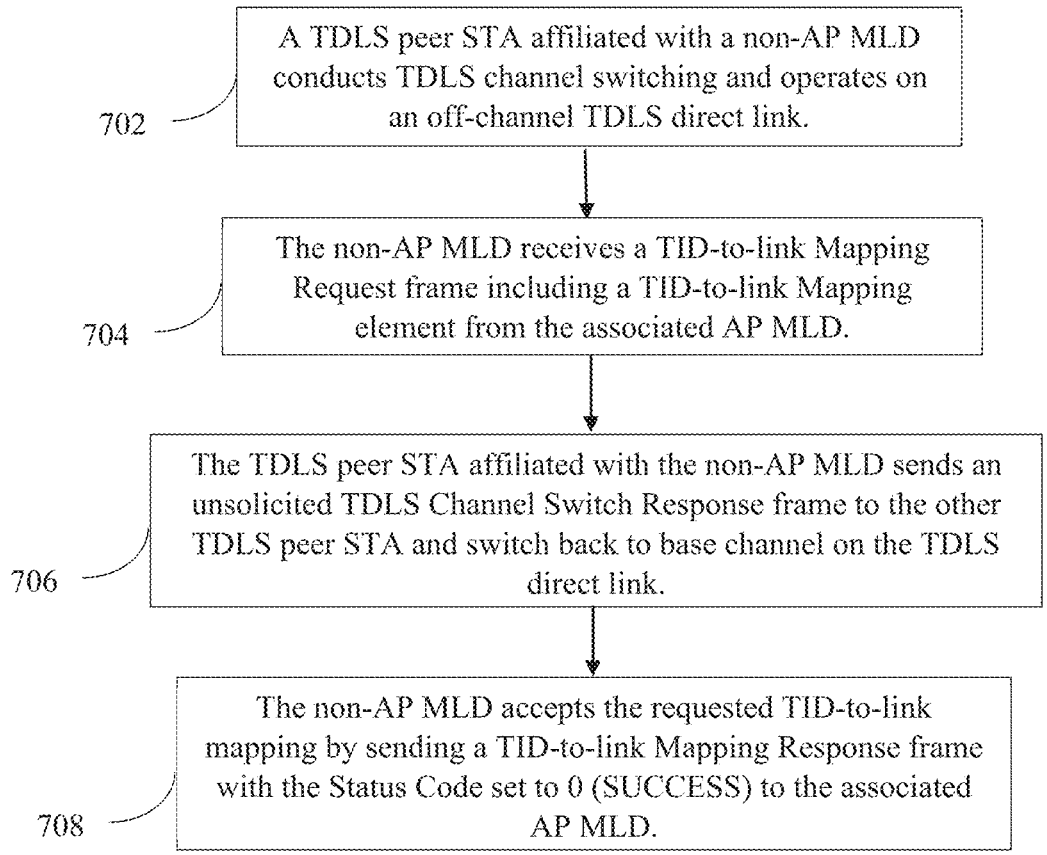
FIG. 7 illustrates an example process for sending an unsolicited TDLS Channel Switch Response frame to the other TDLS peer STA indicating the base channel as the target channel according to various embodiments of the present disclosure.

FIG. 7 illustrates an example process for sending an unsolicited TDLS Channel Switch Response frame to the other TDLS peer STA indicating the base channel as the target channel according to various embodiments of the present disclosure. At operation 702, a TDLS peer STA affiliated with a non-AP MLD conducts TDLS channel switching and operates on an off-channel TDLS direct link. At operation 704, the non-AP MLD receives a TID-to-link Mapping Request frame including a TID-to-link Mapping element from the associated AP MLD that intends to enable a link to the non-AP MLD. At operation 706, the TDLS peer STA affiliated with the non-AP MLD sends an unsolicited TDLS Channel Switch Response frame to the other TDLS peer STA and switches the TDLS direct link back to the base channel. At operation 708, the non-AP MLD accepts the requested TID-to-link mapping by sending a TID-to-link Mapping Response frame with the Status Code set to 0 (SUCCESS) to the associated AP MLD.

According to another embodiment, the non AP MLD receiving a TID-to-link mapping Request frame from the associated AP MLD can reject the proposed TID-to-link mapping to maintain use of the off-channel TDLS direct link and avoid potential NSTR operation by keeping the TID-to-link mapping unchanged.

Figure 8:
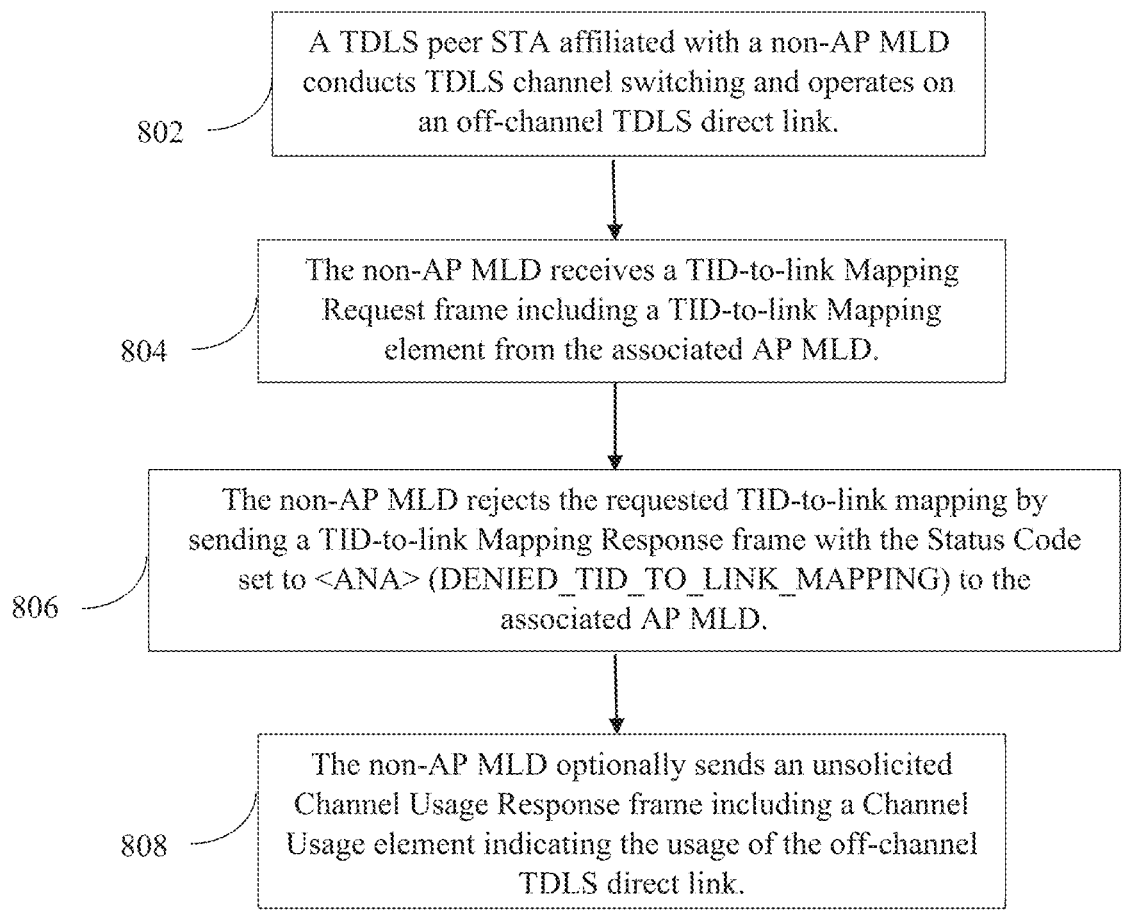
FIG. 8 illustrates an example process for rejecting a TID-to-link mapping request from an AP MLD according to various embodiments of the present disclosure.

FIG. 8 illustrates an example process for rejecting a TID-to-link mapping request from an AP MLD according to various embodiments of the present disclosure. At operation 802, a TDLS peer STA affiliated with a non-AP MLD conducts TDLS channel switching and operates on an off-channel TDLS direct link. At operation 804, The non-AP MLD receives a TID-to-link Mapping Request frame including a TID-to-link Mapping element from the associated AP MLD. At operation 806, The non-AP MLD rejects the requested TID-to-link mapping by sending a TID-to-link Mapping Response frame with the Status Code set to <ANA> (DENIED_TID_TO_LINK_MAPPING) to the associated AP MLD. The TID-to-link mapping for the links between the non-AP MLD and the associated AP MLD remain unchanged if the requested TID-to-link mapping is rejected. At operation 808, the non-AP MLD supporting Channel Usage can optionally send an unsolicited Channel Usage Response frame including a Channel Usage element to the associated AP MLD indicating the occupancy of the off-channel TDLS direct link. Alternatively, without affecting the off-channel TDLS direct link, the non-AP MLD can suggest a preferred TID-to-link mapping in the TID-to-link mapping Response frame sent to the associated AP MLD. By either rejecting the request TID-to-link mapping or suggesting a preferred TID-to-link mapping, the intended MLO link remains disabled to protect the off-channel TDLS direct link from NSTR operation.

Figure 9:
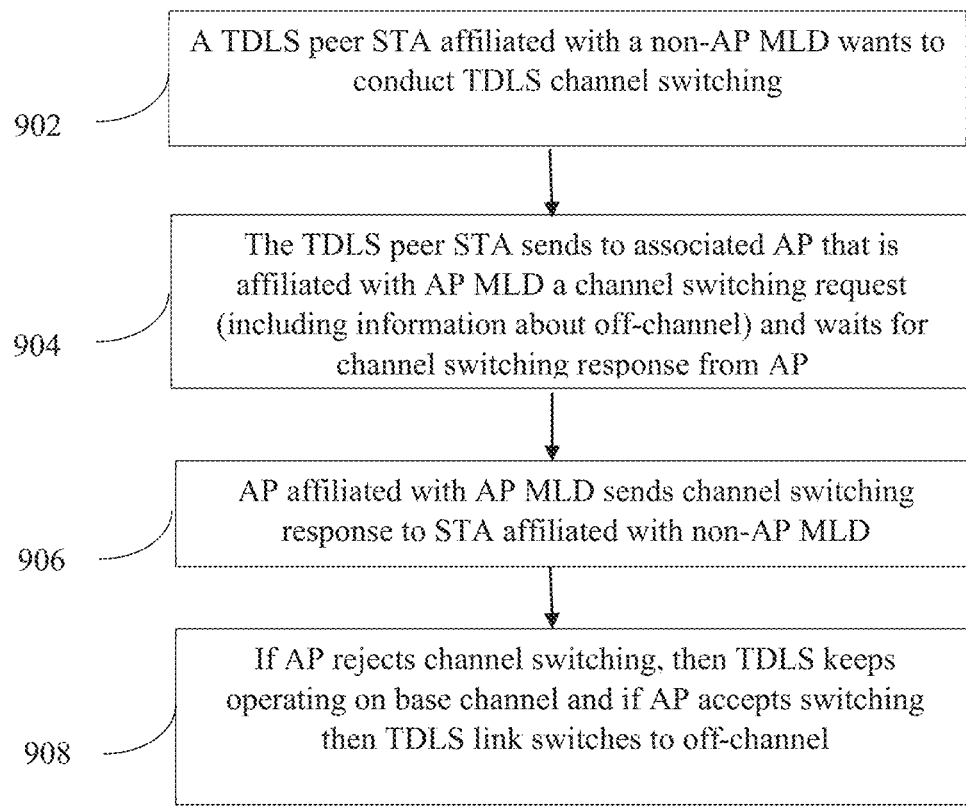
FIG. 9 illustrates an example process for TDLS channel switching negotiation between a non-AP MLD and its associated AP MLD according to various embodiments of the present disclosure.

FIG. 9 illustrates an example process for TDLS channel switching negotiation between a non-AP MLD and its associated AP MLD according to various embodiments of the present disclosure. At operation 902, a TDLS peer STA that is affiliated with a non-AP MLD determines that it wants to conduct TDLS channel switching. At operation 904, the TDLS peer STA affiliated with the non-AP MLD sends a TDLS Channel Switching Request frame to its associated AP affiliated with the AP MLI). When the AP receives the channel switching request at operation 906, it sends a TDLS Channel Switching Response frame to the STA that initiated the channel switching request. The AP may accept or reject channel switching in the response. Following this, at operation 908 the TDLS direct link continues operating on the base channel if the AP rejects channel switching, or switches to the off-channel if the AP accepts channel switching.

An example TDLS Channel Switching Request frame is shown in Table 3. It is encapsulated in a Data frame and transmitted directly to the associated AP to request TDLS direct link switching to another channel. The AP may respond with the example TINS Channel Switching Response frame that is shown in Table 4. The TDLS Channel Switching Response frame is encapsulated in a Data frame and transmitted directly from the associated AP to the STA that has transmitted the TDLS Channel Switching Request to accept or reject MIS direct link switching to another channel.

TABLE 3

| Order | Information |
| --- | --- |
| 1 | Category |
| 2 | TDLS Action |
| 3 | Target Channel |
| 4 | Operating Class |
| 5 | Secondary Channel Offset |
| 6 | Link Identifier |
| 7 | Channel Switch Timing |
| 8 | Wide Bandwidth Channel Switch |
| 9 | Country |
| 10 | Transmit Power Envelope |

TABLE 4

| Order | Information |
| --- | --- |
| 1 | Category |
| 2 | TDLS Action |
| 3 | Target Channel |
| 4 | Operating Class |
| 5 | Secondary Channel Offset |
| 6 | Link Identifier |
| 7 | Channel Switch Timing |
| 8 | Wide Bandwidth Channel Switch |
| 9 | Country |

TABLE 4-continued

| Order | Information |
| --- | --- |
| 10 | Transmit Power Envelope |
| 11 | Channel switching decision (accept/reject) |

In some embodiments of the example of FIG. 9, the TDLS Channel Switching Request frame contains an extra field as shown in Table 5. The extra field is the TID of the traffic that is ongoing on the TDLS link. This helps the AP to decide whether to accept or reject the TDLS Channel Switching Request.

TABLE 5

| Order | Information |
| --- | --- |
| 1 | Category |
| 2 | TDLS Action |
| 3 | Target Channel |
| 4 | Operating Class |
| 5 | Secondary Channel Offset |
| 6 | Link Identifier |
| 7 | Channel Switch Timing |
| 8 | Wide Bandwidth Channel Switch |
| 9 | Country |
| 10 | Transmit Power Envelope |
| 11 | TID of TDLS Traffic |

In other embodiments of the example of FIG. 9, the TDLS Channel Switching Response frame contains an extra Suggested Channel Number field as shown in Table 6. The Suggested Channel Number field is 0 when channel switching is accepted, and contains a suggested channel for the TDLS link to switch to when the TDLS Channel Switching Response rejects channel switching in order to help the TDLS link to try switching to a different channel that may be less loaded or does not cause NSTR condition violation.

TABLE 6

| Order | Information |
| --- | --- |
| 1 | Category |
| 2 | TDLS Action |
| 3 | Target Channel |
| 4 | Operating Class |
| 5 | Secondary Channel Offset |
| 6 | Link Identifier |
| 7 | Channel Switch Timing |
| 8 | Wide Bandwidth Channel Switch |
| 9 | Country |
| 10 | Transmit Power Envelope |
| 11 | Channel switching decision (accept/reject) |
| 12 | Suggested Channel Number |

In some embodiments, the TDLS channel switching negotiation of FIG. 9 occurs if the TDLS link is operating in the 6 GHz band where automated frequency coordination (AFC) is needed or in the 5 GHz band with dynamic frequency selection (DFS). In the legacy 2.4 GHz band, a TDLS switching notification is used as explained with respect to FIG. 4.

In some embodiments, there is coordination of TDLS channel switching negotiation between a non-AP MLD and its associated AP MLD and TDLS channel switching negotiation with the other non-AP MLD involved in the TDLS link.

In some such embodiments, the STA initiating TDLS channel switching to an off-channel starts negotiation with the associated AP as described in any of the previous embodiments and if it receives TDLS channel switching acceptance from the associated AP, it may start negotiation with the other STA involved in the TDLS link. If the other STA accepts the TDLS channel switching, then TDLS channel switching occurs. If TDLS channel switching is not accepted, then the initiating STA or the other STA may send a new round of negotiation or notification to the associated AP to update the AP that TDLS channel switching has not occurred.

In other such embodiments, the STA initiating TDLS channel switching to an off-channel starts negotiation with the other STA involved in the TDLS link, and if TDLS channel switching is accepted by the other STA, then the initiating STA may start negotiating with the associated AP as described in any of the previous embodiments. If the initiating STA receives TDLS channel switching acceptance from the associated AP, then TDLS channel switching occurs. If TDLS channel switching is not accepted, then the initiating STA or the other STA may send a new round of negotiation or notification to the other STA to update the STA that TDLS channel switching has not occurred.

In other such embodiments, the STA initiating TDLS channel switching to an off-channel starts negotiation with the associated AP as described in any of the previous embodiments. If the associated AP rejects TDLS channel switching, then it informs the initiating STA in a TDLS Channel Switching Response frame. However, if the associated AP plans to accept the TDLS channel switching request, then before encapsulating the acceptance in the TDLS Channel Switching Response frame, the AP will first send the TDLS Channel Switching Request to the other STA involved in the TDLS link. If the other STA accepts the TDLS channel switching, then the AP may indicate acceptance of TDLS channel switching in the TDLS Channel Switching Response frame encapsulated from the AP to the initiating STA. This is a similar behavior of tunneled frames in TDLS.

In other such embodiments, the STA initiating TDLS channel switching to an off-channel starts negotiation with the other STA involved in the TDLS link, and if the other STA plans to accept TDLS channel switching, then it may first start the negotiation (on behalf of the initiating STA) with the associated AP before it sends a response to the initiating STA. The other STA may follow any of the negotiation procedures described above. If the associated. AP accepts TDLS channel switching, then the other STA may send a. TDLS channel switching acceptance encapsulated in a TILS Channel Switching Response frame to the initiating STA.

According to one embodiment, in reference to FIG. 3 if STA1 and STA2 form an NSTR link pair, then before STA1 and STA2 transition to off channel TDLS from base channel TDLS, or to base channel TDLS from off channel TDLS, the non-AP MLD-1, through any enabled link between the AP MLD and the non-AP MLD-1, may send a TDLS Impending Channel Switch Notification frame to the AP MLD to notify the AP MLD about the impending TDLS channel switch. For TDLS channel switching, the target channel may or may not form an NSTR link pair with the other links of the non-AP MLD. In the case that STA1 moving to and operating on the target TDLS channel also forms an NSTR link pair with other links of the non-AP MLD, the AP MLD can continue to observe all the NSTR transmission rules for transmitting to the non-AP MLD. In the case that STA1 moving to and operating on the target TDLS channel does not form an NSTR link pair with other links of the non-AP MLD, the AP MLD may not observe any NSTR transmission rules for transmitting to the non-AP MLD after STA1 transitions to the target channel.

According to another embodiment, if a first STA affiliated with a non-AP MLD has a TDLS direct link set up with a second STA, and if the first STA's off channel TDLS direct link forms an NSTR link pair with another STA affiliated with the same non-AP MLD, then the non-AP MLD, through any enabled link between the AP MLD and the non-AP MLD, may send a TDLS Impending Channel Switch Notification frame to the AP MLD to notify the AP MLD about the impending TDLS channel switch.

According to another embodiment, upon receiving the TDLS Impending Channel Switch Notification frame from a non-AP MLI), the AP MLD may send a TDLS Impending Channel Switch Acknowledgement frame to the non-AP MLD as an acknowledgement frame for the received TDLS impending Channel Switch Notification frame from the non-AP MLD.

According to one embodiment, a non-AP MLD that sends a TDLS Impending Channel Switch Notification frame to the AP MLD may wait to receive a TDLS impending Channel Switch Acknowledgement frame from the AP MLD before a STA affiliated with the non-AP MD switches its TDLS channel. According to another embodiment, if the non-AP MLD, after sending the TDLS Impending Channel Switch Notification frame to the AP MLD, doesn't receive a TDLS Impending Channel Switch Acknowledgement frame from the AP MLD, a STA affiliated with the non-AP MLD may still switch its TDLS channel if a certain time period, e.g., a TDLS Impending Channel Switch Wait Duration, has elapsed since the TDLS Impending Channel Switch Notification frame transmission to the AP MLD by the non-AP MM. A STA affiliated with the non-AP MLD may switch its TDLS channel at a time that is the earlier of (i) receiving a TDLS Impending Channel Switch Acknowledgement frame from the AP MLD and (ii) after expiration of the TDLS Impending Channel Switch Wait Duration period since the TDLS impending Channel Switch Notification frame transmission to the AP MLD by the non-AP MLD.

According to one embodiment, the TDLS impending Channel Switch Notification frame can be a Control frame or Management frame, or Data frame. The TDLS Impending Channel Switch Notification frame can contain any subset of the below information:

Frame Control
Duration
Receiver Address (RA): This can be either the MAC address of the STA receiving the frame or the MAC address of the MILD that receives the frame.
Transmitter Address (TA): This can be either the MAC address of the STA transmitting the frame or the MAC address of the MLD that transmits the frame.
Destination Address (DA): This can be either the MAC address of the destination STA of the frame or the MAC address of the destination MLD of the frame.
Switch to Base Channel Indication: Indication on whether the impending channel switch corresponds to a switch to base channel or a switch to off-channel.
Ack Request Indication: Indication whether a subsequent acknowledgement frame is requested from the recipient of the TDLS Impending Channel Switch Notification frame.

Link ID: Indicates the link on which a STA affiliated with a non-AP MLD is operating and is going to start or end its transmission over the TDLS direct link. This can also be a bitmap.
TDLS Link Identifier: specifies the TDLS link on which the TDLS channel switch is going to occur.
FCS (Frame control sequence)
TDLS Impending Channel Switch Wait Duration
Target Channel: Identifies the target channel of the TDLS channel switch.

According to one embodiment, the TDLS Impending Channel Switch Acknowledgement frame can be a Control frame or Management frame, or Data frame. The TDLS Impending Channel Switch Acknowledgement frame can contain any subset of the information listed above for the TDLS Impending Channel Switch Notification frame, FIG. 10A illustrates an example format of the TDLS Impending Channel Switch Notification frame as a Control frame according to various embodiments of the present disclosure.

FIG. 10B illustrates an example field format of the TDLS Channel Switch Information field according to various embodiments of the present disclosure.

FIG. 11 illustrates an example format of the TDLS Impending Channel Switch Acknowledgement frame as a Control frame according to various embodiments of the present disclosure.

Figure 12:
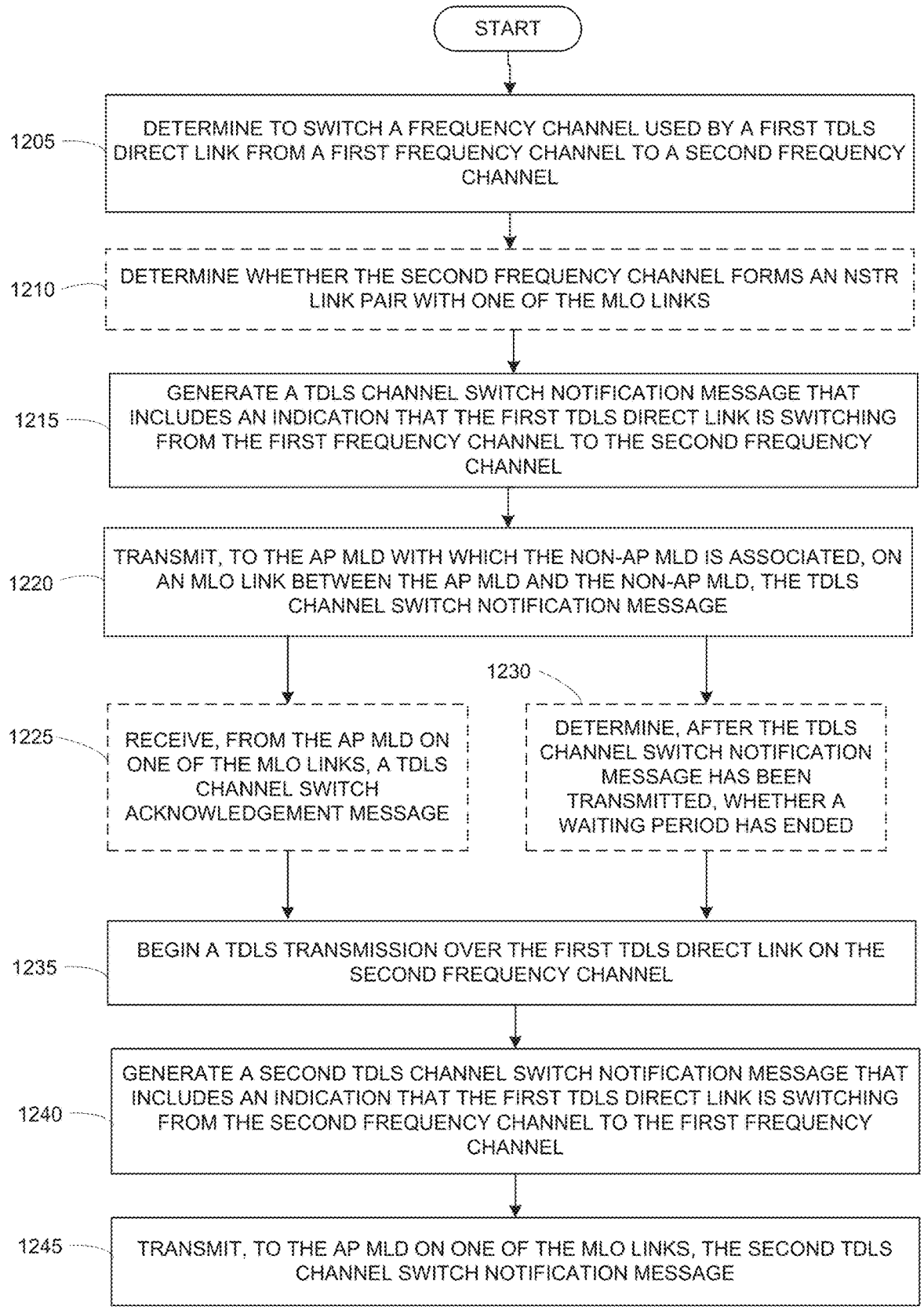
FIG. 12 illustrates an example process for avoidance of potential NSTR constraint violation or overlap caused by TDLS channel switching and link enablement in MLO in WLANs according to various embodiments of the present disclosure.

FIG. 12 illustrates an example process for avoidance of potential NSTR constraint violation or overlap caused by TDLS channel switching and link enablement in MLO in WLANs according to various embodiments of the present disclosure. The process of FIG. 12 is discussed as being performed by a non-AP MLI), but it is understood that a corresponding AP MED performs a corresponding process. Additionally, for convenience, the process of FIG. 12 is discussed as being performed by a WI-FI non-AP MLD comprising a plurality of STAs that each comprise a transceiver configured to transmit and receive first signals on an MLO link between the STA and a corresponding AP of an AP MU) with which the non-AP MLD is associated, and to transmit or receive second signals on a TDLS direct link between the STA and a corresponding peer STA operating at the other end of the TDLS direct link. However, it is understood that any suitable wireless communication device could perform these processes.

Referring to FIG. 12, the process begins with the non-AP MU) determining to switch a frequency channel used by a first TDLS direct link from a first frequency channel to a second frequency channel (step 1205). The first frequency channel may be the base channel, and the second frequency channel may be the off-channel. This may occur when, for example, the non-AP MLD determines that the first frequency channel has lower channel quality than the second frequency channel.

In some embodiments, the non-AP MLD next determines whether the second frequency channel forms an NSTR link pair with one of the MLD links between the non-AP MU) and the AP MLD (step 1210), This can include determining whether an NSTR link pair is formed with a currently disabled MLO At step 1215, the non-AP MLD generates a TDLS channel switch notification message that includes an indication that the first TDLS direct link is switching from the first frequency channel to the second frequency channel. In embodiments that include step 1210, the TDLS channel switch notification message is generated when the non-AP MLD determines at step 1210 that the second frequency channel forms an NSTR link pair with one of the MILO links. The TDLS channel switch notification message may be generated as one of a control frame, a management frame, or a data frame. The generated control frame, management frame, or data frame includes an indication that a TDLS channel switch for the first TDLS direct link is occurring and an indication that a target channel of the TDLS channel switch is the second frequency, channel.

The non-AP MLD next transmits, to the AP MLD on an MLO link between the AP MILD and the non-AP MLD, the TDLS channel switch notification message (step 1220). After this transmission, the non-AP MLD may perform one or both of steps 1225 and 1230.

At step 1225, the non-AP MLD receives, from the AP MLD on one of the MLO links, a TDLS channel switch acknowledgement message as an acknowledgement of receipt of the TDLS channel switch notification message by the AP MLD.

At step 1230, the non-AP MLD determines, after the TDLS channel switch notification message has been transmitted, whether a waiting period has ended. The non-AP MLD may do this by starting a timer after the TDLS channel switch notification message has been transmitted, and determining that the timer has expired.

At step 1235, the non-AP MLD begins a TDLS transmission over the first TDLS direct link on the second frequency channel. The non-AP MLD may begin this transmission either upon receipt of the TDLS channel switch acknowledgement message (at step 1225) or upon determination that the waiting period has ended (at step 1230), whichever is earlier.

Then, the non-AP MLD generates a second TDLS channel switch notification message that includes an indication that the first TDLS direct link is switching from the second frequency channel to the first frequency channel (step 1240). This may occur when, for example, the non-AP MLD determines that the channel quality of the first frequency channel has returned to an acceptable level. The second TDLS channel switch notification message may be generated in a similar manner to that described in step 1215.

The non-AP MLD then transmits, to the AP MLD on one of the MLO links, the second TDLS channel switch notification message (step 1245).

The above flowchart illustrates an example method that can be implemented in accordance with the principles of the present disclosure and various changes could be made to the method illustrated in the flowchart. For example, while shown as a series of steps, various steps could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A non-access point (AP) multi-link device (MLD) comprising:
   a plurality of stations (STAs), wherein each STA of the plurality of STAs comprise a transceiver configured to:
      transmit or receive first signals on a multi-link operation (MLO) link between the STA and a corresponding AP of an AP MLD with which the non-AP MLD is associated, and
      transmit or receive second signals on a tunneled direct link setup (TDLS) direct link between the STA and a corresponding peer STA operating at the other end of the TDLS direct link; and
   a processor operably coupled to the transceivers, the processor configured to:
      determine to switch a frequency channel used by a first TDLS direct link from a first frequency channel to a second frequency channel, and
      generate a TDLS channel switch notification message that includes an indication that the first TDLS direct link is switching from the first frequency channel to the second frequency channel,
   wherein one or more of the transceivers corresponding to the STAs affiliated with the non-AP MLD are further configured to transmit, to the AP MLD on one of the MLO links between the AP MLD and the non-AP MLD, the TDLS channel switch notification message.

2. The non-AP MLD of claim 1, wherein the processor is further configured to:
   determine whether the second frequency channel forms a non-simultaneous transmit/receive (NSTR) link pair with one of the MLO links, and
   generate the TDLS channel switch notification message based on a determination that the second frequency channel forms the NSTR link pair with the one of the MLO links.

3. The non-AP MLD of claim 1, wherein:
   the processor is further configured to generate a second TDLS channel switch notification message that includes an indication that the first TDLS direct link is switching from the second frequency channel to the first frequency channel, and
   the one or more of the transceivers are further configured to transmit, to the AP MLD on one of the MLO links, the second TDLS channel switch notification message.

4. The non-AP MLD of claim 1, wherein:
   the processor is configured to generate the TDLS channel switch notification message as one of a control frame, a management frame, or a data frame, and
   the generated control frame, management frame, or data frame includes an indication that a TDLS channel switch for the first TDLS direct link is occurring and an indication that a target channel of the TDLS channel switch is the second frequency channel.

5. The non-AP MLD of claim 1, wherein one or more of the transceivers are further configured to receive, from the AP MLD on one of the MLO links, a TDLS channel switch acknowledgement message as an acknowledgement of receipt of the TDLS channel switch notification message by the AP MLD.

6. The non-AP MLD of claim 5, wherein one or more of the transceivers are further configured to begin a TDLS transmission over the first TDLS direct link on the second frequency channel after receiving the TDLS channel switch acknowledgement message.

7. The non-AP MLD of claim 5, wherein:
the processor is further configured to determine, after the TDLS channel switch notification message has been transmitted, whether a waiting period has ended, and
one or more of the transceivers are further configured to begin a TDLS transmission over the first TDLS direct link on the second frequency channel at a time that is the earlier of (i) after receiving the TDLS channel switch acknowledgement message and (ii) after a determination that the waiting period has ended.

8. An access point (AP) multi-link device (MLD) comprising:
a plurality of APs that each comprise a transceiver configured to:
transmit or receive first signals on a multi-link operation (MLO) link between the APs and corresponding first stations (STAs) of a non-AP MLD with which the AP MLD is associated, wherein a first tunneled direct link setup (TDLS) direct link is formed between a first STA of the first non-AP MLD and a corresponding peer STA operating at the other end of the first TDLS direct link,
wherein one or more of the transceivers are further configured to receive, from the non-AP MLD on one of the MLO links between the AP MLD and the non-AP MLD, a TDLS channel switch notification message that includes an indication that the first TDLS direct link is switching from a first frequency channel to a second frequency channel; and
a processor operably coupled to the transceivers, the processor configured to determine, based on the TDLS channel switch notification message, that the first TDLS direct link either is switching or has switched from the first frequency channel to the second frequency channel.

9. The AP MLD of claim 8, wherein the processor is further configured to:
determine, based on the TDLS channel switch notification message, whether the second frequency channel forms a non-simultaneous transmit/receive (NSTR) link pair with one of the MLO links, and
refrain from activating the one of the MLO links based on a determination that the second frequency channel forms the NSTR link pair with the one of the MLO links.

10. The AP MLD of claim 8, wherein:
the one or more of the transceivers are further configured to receive, from the non-AP MLD on one of the MLO links, a second TDLS channel switch notification message that includes an indication that the first TDLS direct link is switching from the second frequency channel to the first frequency channel, and
the processor is further configured to determine, based on the second TDLS channel switch notification message, that the first TDLS direct link either is switching or has switched from the second frequency channel to the first frequency channel.

11. The AP MLD of claim 8, wherein:
the TDLS channel switch notification message is one of a control frame, a management frame, or a data frame, and
the control frame, management frame, or data frame includes an indication that a TDLS channel switch for the first TDLS direct link is occurring and an indication that a target channel of the TDLS channel switch is the second frequency channel.

12. The AP MLD of claim 8, wherein:
the processor is further configured to generate a TDLS channel switch acknowledgement message as an acknowledgement of receipt of the TDLS channel switch notification message by the AP MLD, and
one or more of the transceivers are further configured to transmit, to the non-AP MLD on one of the MLO links, the TDLS channel switch acknowledgement message.

13. The AP MLD of claim 12, wherein a TDLS transmission begins over the first TDLS direct link on the second frequency channel after receipt of the TDLS channel switch acknowledgement message by the non-AP MLD.

14. The AP MLD of claim 12, wherein a TDLS transmission begins over the first TDLS direct link on the second frequency channel at a time that is the earlier of (i) after receipt of the TDLS channel switch acknowledgement message by the non-AP MLD and (ii) after a determination that a waiting period has ended.

15. A method of wireless communication performed by a non-access point (AP) multi-link device (MLD), the method comprising:
determining to switch a frequency channel used by a first tunneled direct link setup (TDLS) direct link from a first frequency channel to a second frequency channel, wherein the first TDLS direct link is formed between a station (STA) of the non-AP MLD and a corresponding peer STA operating at the other end of the TDLS direct link;
generating a TDLS channel switch notification message that includes an indication that the first TDLS direct link is switching from the first frequency channel to the second frequency channel; and
transmitting, to an AP MLD with which the non-AP MLD is associated, on a multi-link operation (MLO) link between the AP MLD and the non-AP MLD, the TDLS channel switch notification message, wherein MLO links are formed between STAs of the non-AP MLD and APs of the AP MLD.

16. The method of claim 15, further comprising:
determining whether the second frequency channel forms a non-simultaneous transmit/receive (NSTR) link pair with one of the MLO links; and
generating the TDLS channel switch notification message based on a determination that the second frequency channel forms the NSTR link pair with the one of the MLO links.

* * * * *